METHOD OF MANUFACTURING A PHOTOSENSITIVE DEVICE
Filed May 20, 1968
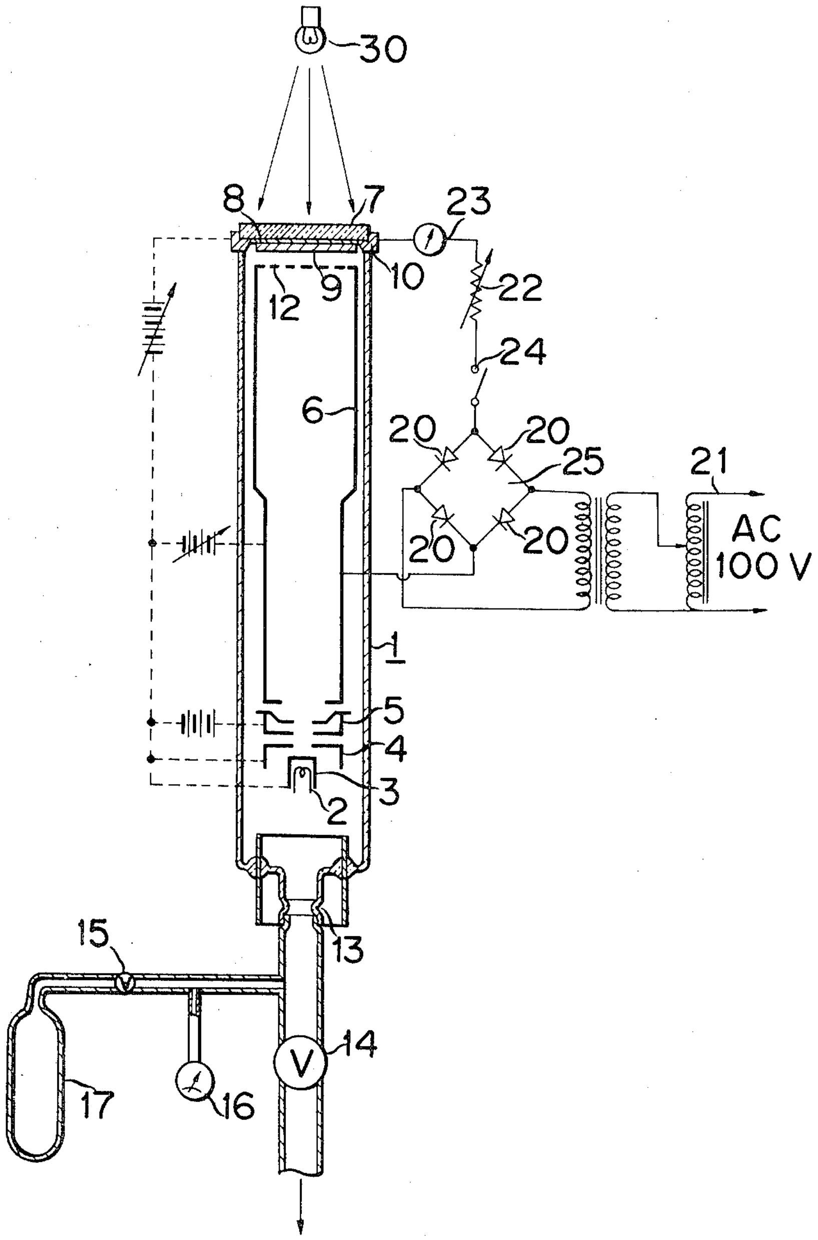
Shigeo Tsuji
BY
INVENTOR.
[signature] Attorney United States Patent Office 3,573,097 Patented Mar. 30, 1971

3,573,097
METHOD OF MANUFACTURING A PHOTOSENSITIVE DEVICE

Shigeo Tsuji, Fujisawa-shi, Japan, assignor to Tokyo-Shibaura Electric Co., Ltd., Kawasaki-shi, Japan Filed May 20, 1968, Ser. No. 730,554
Claims priority, application Japan, May 23, 1967, 42/32,288
Int. Cl. H01j *31/28*
U.S. Cl. 117—211 5 Claims

ABSTRACT OF THE DISCLOSURE

A method of manufacturing a photosensitive device which comprises the step of bombarding under vacuum electron beams of 10 to 1,000 ev. onto the surface of a lead monoxide layer which has been subjected to after-treatment by carrying out an electrical discharge through an oxygen-containing atmosphere thereby to remove excess oxygen atoms deposited on the surface of the lead monoxide layer.

The present invention relates to a method of manufacturing a photosensitive device having a photosensitive material layer mainly consisting of lead monoxide (PbO) formed on the substrate of the device, and more particularly to a method of manufacturing a photosensitive device used in a vidicon camera tube.

The hitherto known photosensitive devices were prepared by depositing the vapour of lead monoxide powders on the substrate of the device heated to a suitable temperature in a low pressure oxygen atmosphere so as to form a lead monoxide target plate. However, the target manufactured by such process did not receive an after-treatment, and had the drawbacks that when used in a vidicon camera tube, it rapidly deteriorated in sensitivity and resolution. The cause is deemed attributable to the fact that the lead monoxide layer lacking an after-treatment consisted of weakly bonded and consequently chemically unstable lead and oxygen atoms, so that when the target was scanned with electron beams oxygen atoms were scattered off the lead monoxide layer due to the bombardment of the electron beams.

To improve these shortcomings, there has been proposed a method which consisted in subjecting the target to heat treatment in a low pressure oxygen atmosphere or in the air 0.5 to 1 hour at a temperature of 20 to 300° C. thereby to reinforce the bonding of oxygen and lead atoms contained in the lead monoxide. While the target prepared by this method was indeed improved in the aforesaid drawbacks, there was presented a new handicap that the residual image was retained rather long.

Also, U.S. Pat. 3,307,983 proposes the following method. The surface of the lead monoxide layer remote from the substrate thereof is subjected to the bombardment of oxygen ions and intervening exposure to an atmosphere containing a gas of the group consisting of water vapour, sulphurated hydrogen, seleniated hydrogen, tellurated hydrogen or a mixture of two or more of these gases. During this exposure the gas diffuses to such an extent into the surface of the photoconducting layer that the oxygen introduced into said surface by the preceding bombardment is more or less compensated.

However, the above-mentioned U.S. patent method had an extremely small practical value, because the lead monoxide layer and the cathode of the vidicon camera tube were corroded by the aforementioned gases. Moreover, the method required a high discharge voltage and caused the lead monoxide layer to be damaged due to the bombardment of electron beams, considerably reducing the resolving power of said layer.

The inventor has found that when the free surface of a lead monoxide layer is subjected to plasma oxidation by bombarding oxygen ions thereon by gas discharge in a low pressure oxygen atmosphere, then said surface will not be readily deteriorated in either sensitivity or resolution, even though slow electron beams are applied, but that the lead and oxygen atoms contained in the lead monoxide layer will be more strongly bonded. However, it has also disclosed that while the lead monoxide target thus prepared, when used in a camera tube, was indeed improved in various properties such as sensitivity, residual image and dark current, it had a very poor resolving power. Such decline in resolution was found to arise from the fact that the surface of the lead monoxide was excessively oxidized and that the reduced electrical resistance of the surface caused the stored charge to be diverted to said surface. Therefore, when the free surface of the lead monoxide layer was bombarded with accelerated electron beams of 10 to 1,000 ev. to remove the excess oxygen atoms the electrical resistance of said surface again increased to improve resolution without losing other electrical properties of the lead monoxide layer.

The object of the present invention originating with the recognition of the aforementioned facts is to provide a method of manufacturing a durable and efficient photosensitive device consisting of lead monoxide. More particularly, the method of the present invention, which is intended to manufacture a vidicon camera tube having a lead monoxide layer deposited by evaporation on a transparent substrate provided with a transparent conducting signal electrode, is characterized in that after being subjected to plasma oxidation, the free surface of the lead monoxide target is bombarded with accelerated electron beams of 10 to 1,000 ev. to remove excess oxygen atoms contained in said target.

The foregoing and other objects as well as characteristic features of the invention will become more apparent and more readily understandable from the following description and the appended claims when read in conjunction with the accompanying drawing.

The figure shows diagrammatically part of an arrangement used in the manufacture according to the invention of a vidicon-type camera tube.

There will now be described the method of manufacturing a lead monoxide layer according to an embodiment of the present invention. A substrate consisting of a flat transparent glass plate coated with a transparent conducting signal electrode made of, for example, tin oxide is heated in advance to a temperature of 120° C. in an oxygen atmosphere pressurized to, for example, $5\times10^{-2}$, and there is deposited by evaporation a lead monoxide layer on said substrate. The lead monoxide layer is only required to have a thickness of 7 to 20 microns. This embodiment uses a lead monoxide layer 14 microns thick.

Next in front of that side of the substrate coated with the lead monoxide layer is disposed a metal plate parallel to said substrate at a space of 4 mm. The metal plate may have approximately the same size as the substrate or slightly larger. These substrate and metal plate are placed in an oxygen atmosphere pressurised to $5\times10^{-1}$. Under a condition heated to 120° C., the substrate is impressed with a voltage of about 600 v., using the transparent conducting signal electrodes as a cathode and the metal plate as an anode. Then there will occur a gas discharge in the space between them to generate oxygen ions. The oxygen ions impinge on the surface of the lead monoxide layer due to an electric field being produced across both poles thereby to subject said surface to plasma oxidation. If, in this case, a light is projected on the lead monoxide layer to render it electrically conductive there will be obtained a greater oxidising effect. Adjustment of the extent of oxidation may be carried out simply by selecting an appropriate time of conduction, say, 3 to 30 seconds. Thereafter the oxygen and lead atoms present on the surface of the lead monoxide layer will be bonded with considerable strength, also rendering said surface much more conductive.

After plasma oxidation, the oxygen atmosphere is removed, and the free surface is bombarded under high vacuum with electron beams accelerated with 10 to 1,000 volts, for example, 200 volts so as to eliminate excess oxygen atoms carried into the surface of the lead monoxide layer. In an instance, the transparent conducting signal electrode is impressed with +200 volts. The electron-emitting cathode whose voltage is reduced to zero is heated to release thermal electrons and cause them to impinge on the surface of the lead monoxide layer. The electron beams to be bombarded on said layer may be in the form of floods or focused so as to scan the surface thereof. In this case, it is preferable to render the lead monoxide layer conductive by projecting a light thereon, because this will increase the effect of expelling oxygen atoms, and consequently raise the electrical resistance of the lead monoxide layer to a required extent in a short time. Electron beams are bombarded for a certain length of time, for example, 0.5 to 1 hour. The lead monoxide layer thus obtained enables a camera tube to have a high resolving power, long life and greater freedom from residual images.

There will now be described by reference to the appended drawing an embodiment of the present invention wherein the method according to the invention of manufacturing a lead monoxide layer is applied in preparing said layer as a target for a vidicon-type camera tube. Namely, at one end of a cylindrical bulb 1 are arranged a heater 2, cathode 3, a first cylindrical grid electrode 4, a second cylindrical grid electrode 5 and a third cylindrical grid electrode 6 on the same axial line.

To the other end of the cylindrical bulb 1 is fitted through an annular metal electrode 10 made of, for example, indium a transparent substrate 7 made of, for example, glass which is coated by evaporation under the aforementioned conditions with a transparent conducting signal electrode 8 and lead monoxide layer 9, in such a manner that the lead monoxide layer 9 can be scanned with electron beams from the cathode 3. The annular metal electrode 10 and transparent conducting signal electrode 8 are electrically connected to give signals. Parallel to the glass substrate 7 is disposed a mesh electrode 12 so as to be electrically connected to the third grid electrode 6.

A line at the seal end 13 of the cylindrical bulb 1 on the side of the cathode 3 is branched off into two parts, one of which is connected through a cock 14 to an exhaust means (not shown) and the other to an oxygen cylinder 17 through a cock 15 and a vacuum gauge 16.

There will now be described a method of manufacturing a vidicon-type camera tube. The cylindrical bulb 1 of the vidicon-type camera tube is evacuated by the aforesaid exhaust means and then shut off from the exhaust system by means of the cock 14. The cock 15 is opened to introduce oxygen from the oxygen cylinder to provide a pressure of 0.5 mm. Hg in the cylindrical bulb 1. The oxygen pressure therein is controlled by readings on the vacuum gauge 16. With the mesh electrode 12 as an anode, and the annular metal electrode 10 as a cathode, an electric current is introduced to produce a gas discharge across the lead monoxide layer 9 and the mesh electrode 12 opposite thereto and form by plasma oxidation an excess thin oxide layer on the surface of the lead monoxide layer 9. In this case, the lead monoxide layer 9 and mesh electrode 12 are set apart 4 mm. from each other. When a voltage source is used, an alternating current is rectified through a rectification circuit 25 involving, for example, a diode, and the voltage supplied is controlled by a variable transformer 21. A variable resistor 22 is adjusted to 500KΩ to set a discharge current at 0.2 ma. and an electric current is introduced 3 seconds. The discharge current is controlled by an ammeter 23. The time of conduction is reduced for a large discharge current and increased for a small discharge current. The time of conduction is controlled by a switch 24.

An oxygen pressure between $6\times10^{-2}$ and 1 mm. Hg may be selected for the discharge current ranging from 350 to 950 volts. A discharge voltage of more than 1,000 volts is not desirable because the lead monoxide layer will be damaged in discharge. While an oxygen pressure below $6\times10^{-2}$ mm. Hg elevates the discharge voltage, it is also undesirable owing to the similar damage of the layer.

As previously described, it will increase the oxidizing effect at the time of gas discharge to project the light of an incandescent lamp 30 on the lead monoxide layer so as to render it conductive. In the aforementioned embodiment the plasma oxidation of the lead monoxide layer was carried out at a temperature of 120° C. However, normal temperature may also be available for this purpose. The only point is that oxidation at elevated temperatures will more or less improve the sensitivity of a photosensitive device produced.

As mentioned above, after plasma oxidation, oxygen is taken out of the cylindrical bulb 1 for evacuation of the interior thereof, and then the cathode 3 is excited to cause thermal electrons to be emitted therefrom. After plasma oxidation, the surface of the lead monoxide layer is reduced in electrical resistance, so that when the degree of vacuum in the cylindrical bulb 1 reaches less than $10^{-6}$ mm. Hg, the cathode 3 is heated by filament 2 to emit thermal electrons, the first grid electrode 4 and cathode 3 are brought to the same potential using a power source indicated in dotted lines, the second grid electrode 5 is impressed with 300 volts and the third grid electrode 6 similarly with 300 volts thereby to bombard the surface of the lead monoxide layer 9 with the thermal electrons thus released. The annular metal electrode 10 is impressed with 200 volts, and at a point, for example, 30 cm. apart from the glass substrate 7 is positioned a 100 watt incandescent lamp 30 to project a light on the lead monoxide layer 9. When electron beams are caused to impinge on the lead monoxide layer 0.5 to 1 hour under the aforementioned conditions, except oxygen atoms are released from the surface of the layer to raise again the electrical resistance thereof. In this case, the lead monoxide layer 9 may be maintained at normal temperature, but if it is heated to 100 to 120° C. the time of electron beam impingement can be reduced. The abovementioned embodiment used flooded electron beams, but the electron beams may alternatively be focused and deflected using a separate coil (not shown) to sweep the surface of the lead monoxide layer. Then there will be obtained electron beams of high current density, thus enabling the electrical resistance of the layer to be restored to a desired extent in a short time. While it is more effective to impress higher voltages on the lead monoxide layer, such impression should preferably be carried out at below 1,000 volts, because a voltage beyond this level is likely to damage the lead monoxide layer.

The cylindrical bulb 1 is filled with oxygen pressurised to 1 mm. Hg and allowed to stand 1 hour at 120° C. When the cylindrical bulb 1 is evacuated to $10^{-7}$ mm. Hg by removing the oxygen again the exhaust pipe is sealed up at the seal end 13 to finish a camera tube. An alternative process of expelling oxygen from the cylindrical bulb 1 after plasma oxidation and carrying out the aforementioned treatment with electron beams after sealing up the bulb 1 under high vacuum will also bring about the same effect as the preceding process.

As mentioned above, the manufacturing method of the present invention enables the lead and oxygen atoms on the surface of a lead monoxide layer to be strongly bonded together by plasma oxidation, thus obtaining a lead monoxide layer target of photoelectric conductivity which is stable to the impingement of scanning electron beams.

In other words, the present invention involves the steps of forming a lead monoxide layer on a substrate, subjectingthe surface of the lead monoxide layer to plasma oxidation and impinging electron beams on the surface thus processed, thereby to produce a desired photosensitive device. Consequently the invention has resolved all the aforementioned drawbacks, reduced residual images due to plasma oxidation and completely eliminated the denaturation of the lead monoxide layer due to scorching. Furthermore, removal of excess oxygen atoms by bombardment of accelerated electron beams of 10 to 1,000 ev. enables a target of photoelectric conductivity to display a high degree of resolution. Also heat treatment in an oxygen atmosphere reduces dark currents and raises the sensitivity of the subject photosensitive device.

The camera tube using the prior art lead monoxide target was degraded in quality in a service life of only about a dozen hours, whereas a camera tube consisting of a lead monoxide target manufactured according to the present invention is proved to be free from any deterioration of properties even in use of more than 1,000 hours. Therefore, if the lead monoxide layer of the invention is employed in a camera tube, it will enable the performance and scope of application of the camera tube to be broadened several times the extent which has been possible in the past. It will be apparent that the method of the present invention is effective in manufacturing not only the lead monoxide layer described in the embodiment but also other unstable metal oxides.

Further, treatment of the lead monoxide target by bombardment of accelerated electron beams as employed in the embodiment should preferably be carried out by impressing the target with a voltage of more than 70 volts, because it will enable the treatment to be completed in short hours. If the target voltage is below 70 volts, say, 40 volts, then there will be required several hundred hours of operation. Therefore a voltage of over 70 volts is suitable for practical manufacture of the subject photosensitive device.

While the invention has been described in connection with some preferred embodiments thereof, the invention is not limited thereto and includes any modifications and alterations which fall within the scope of the invention as defined in the appended claims.

What is claimed is:

1. A method of manufacturing a photosensitive device comprising the steps of forming on a substrate a layer consisting essentially of lead monoxide, biasing the lead monoxide layer negatively, effecting an electrical discharge through an atmosphere containing low pressure oxygen to form oxygen ions which bombard the layer to introduce oxygen into the layer and bombarding electron beams of 10 to 1,000 ev. onto the layer under high vacuum and for a length of time sufficient to expel excess oxygen atoms contained therein and increase the electrical resistance of the surface of the layer.

2. A method according to claim 1 wherein said lead monoxide layer is exposed to light during at least one of the steps of effecting an electrical discharge and bombarding electron beams thereon.

3. A method according to claim 1 wherein the low pressure ranges between $6 \times 10^{-2}$ and 1 mm. Hg.

4. A method according to claim 1 wherein the prescribed time of bombardment is 0.5 to 1 hour.

5. A method according to claim 1 wherein the high vacuum is less than $10^{-6}$ mm. Hg.

References Cited

UNITED STATES PATENTS

| | | | |
|---|---|---|---|
| 3,307,983 | 3/1967 | De Hann et al. | 136—89X |
| 3,354,064 | 11/1967 | Letter | 117—62X |
| 3,419,487 | 12/1968 | Robbins et al. | 204—164 |

ALFRED L. LEAVITT, Primary Examiner

J. H. NEWSOME, Assistant Examiner

U.S. Cl. X.R.

117—34, 62, 93.3 124; 313—65